(12) United States Patent
Lee et al.

(10) Patent No.: US 8,441,413 B2
(45) Date of Patent: May 14, 2013

(54) APPARATUS AND SYSTEM FOR VIEWING 3D IMAGE

(75) Inventors: Jae Hyung Lee, Gyeonggi-do (KR); Koon Shik Cho, Seoul (KR)

(73) Assignee: Samsung Electro-Mechanics Co., Ltd. (KP)

( * ) Notice: Subject to any disclaimer, the term of this patent is extended or adjusted under 35 U.S.C. 154(b) by 387 days.

(21) Appl. No.: 12/827,026

(22) Filed: Jun. 30, 2010

(65) Prior Publication Data

US 2011/0254756 A1  Oct. 20, 2011

(30) Foreign Application Priority Data

Apr. 19, 2010  (KR) .................. 10-2010-0035961

(51) Int. Cl.
*G09G 5/00* (2006.01)

(52) U.S. Cl.
USPC .......... 345/9; 345/8; 348/53; 348/54; 348/55; 348/500

(58) Field of Classification Search .................. None
See application file for complete search history.

(56) References Cited

U.S. PATENT DOCUMENTS

| | | | |
|---|---|---|---|
| 2009/0237327 A1* | 9/2009 | Park et al. .................. | 345/8 |
| 2010/0328439 A1* | 12/2010 | Mihara et al. ............... | 348/53 |
| 2011/0149052 A1* | 6/2011 | Bai et al. .................... | 348/54 |
| 2011/0199466 A1* | 8/2011 | Kim et al. ................... | 348/55 |
| 2011/0234771 A1* | 9/2011 | Kim et al. ................... | 348/53 |
| 2012/0026396 A1* | 2/2012 | Banavara .................... | 348/500 |

FOREIGN PATENT DOCUMENTS

| | | |
|---|---|---|
| JP | 08265863 A | 10/1996 |
| JP | 2006-126501 A | 5/2006 |
| KR | 1020090101623 A | 3/2008 |

OTHER PUBLICATIONS

Office Action issued on Jun. 9, 2011 by the Korean Patent Office in corresponding Korean Application No. 10-2010-0035961.

* cited by examiner

*Primary Examiner* — Van Chow
(74) *Attorney, Agent, or Firm* — Lowe Hauptman Ham & Berner, LLP

(57) ABSTRACT

An apparatus and a system for viewing a 3D image including a synchronization signal receiver for receiving 3D image synchronization signal; a 3D control signal generator for generating left-eye glass control signal and a right-eye glass control signal in accordance with the synchronization signal received; a left-eye glass that opens or intercepts light transmitted to the left-eye glass; a right-eye glass that opens or intercepts light transmitted to the right-eye glass; a central processor that controls operation of the 3D control signal generator and transmits the synchronization signal to the 3D control signal generator; and a power controller that connects or intercepts power supplied to the synchronization signal receiver and the central processor. The power consumption of the apparatus is minimized by supplying power to the synchronization signal receiver and the central processor at a time when the synchronization signal is received and power is intercepted during the rest period.

8 Claims, 3 Drawing Sheets

APPARATUS AND SYSTEM FOR VIEWING 3D IMAGE

CROSS REFERENCE TO RELATED APPLICATION

This application claims the benefit of Korean Patent Application No. 10-2010-0035961, filed on Apr. 19, 2010, entitled "Apparatus and System for Viewing 3D Image", which is hereby incorporated by reference in its entirety into this application.

BACKGROUND OF THE INVENTION

1. Technical Field

The present invention relates to outputting of a 3D image and viewing thereof, and more particularly, to a power control technology of a 3D image viewing apparatus.

2. Description of the Related Art

A 3D image technology is adopted in various application fields such as information telecommunication, broadcasting, medical services, education and training, military affairs, games, animations, virtual reality, CAD, industrial technologies, etc., and is a core-based technology of the next-generation 3D multimedia information telecommunication commonly required in various fields.

In general, a 3D effect perceived by humans is generated by complex interaction of the degree of change in the thickness of crystalline lens depending on the location of an object to be observed, an angular difference between both eyes and an object, a difference in position and shape of objects viewed with right and left eyes, a disparity in vision generated by movement of the target, various effects by psychology and memory, etc. Among them, a binocular disparity generated due to positions of both the human's eyes that are spaced from each other in a horizontal direction by approximately 6 to 7 cm may be the most key factor of the 3D effect. That is, the target is viewed with an angular difference by the binocular disparity and images viewed by both eyes have different shapes due to the difference. When two images are transmitted to the brain through a retina, the brain accurately amalgamates information on two images with each other to feel an original 3D image.

3D image display apparatuses are classified into a glass type using special glasses and a non-glass type not using the special glasses. The glass type includes a color filter type separately selecting the images by using color filters having a mutual complementary relationship, a polarizing filter type separating a left-eye image and a right-eye image from each other using a light shielding effect by a combination of polarizing elements orthogonal to each other, and a shutter glass type to feel a 3D effect by alternately intercepting the left eye and the right eye to correspond to a synchronization signal projecting a left-eye image signal and a right-eye image signal to a screen.

Among them, the shutter glass type as a display method using the binocular disparity is a method perceiving spaciousness of images observed at different angles by a brain operation by synchronizing on and off operations of both left and right eyes of the glasses with provision of the image of the display apparatus.

However, in the shutter glass type, it is impossible to view a 3D image only by wearing a shutter glass and it is possible to view the 3D image only by synchronizing the on and off operations of the eyes with the display apparatus in a wired or wireless method. Accordingly, since the synchronization signal Vsync should be continuously received from the display apparatus for the synchronization, battery consumption is large.

Further, the existing shutter glass is configured to receive the synchronization signal primarily in an infrared-ray (IR) type. However, since infrared-rays have linearity, when an obstacle is provided between a transmitter of the display apparatus and a receiver of the shutter glass, transmission of the synchronization signal is interrupted, such that it is impossible to view an accurate 3D image. Further, a viewing range of the display apparatus is also narrowed due to the linearity of the infrared-rays.

SUMMARY OF THE INVENTION

An object of the present invention is to minimize power consumption of a shutter glass type 3D image viewing apparatus by effectively controlling a power supply of the 3D image viewing apparatus.

In order to achieve the above-mentioned object, according to an aspect of the present invention, a 3D image viewing apparatus includes: a synchronization signal receiver that receives a 3D image synchronization signal; a 3D control signal generator that generates a left-eye glass control signal and a right-eye glass control signal in accordance with the synchronization signal received by the synchronization signal receiver; a left-eye glass that opens or intercepts light transmitted to the left-eye glass in accordance with the left-eye glass control signal; a right-eye glass that opens or intercepts light transmitted to the right-eye glass in accordance with the right-eye glass control signal; a central processor that controls an operation of the 3D control signal generator in accordance with the synchronization signal received by the synchronization signal receiver and transmits the synchronization signal to the 3D control signal generator; and a power controller that connects or intercepts power supplied to the synchronization signal receiver and the central processor.

At this time, the synchronization signal receiver may receive the synchronization signal in accordance with an RF communication scheme.

In addition, when the central processor receives the synchronization signal from the synchronization signal receiver, the central processor may turn on the 3D control signal generator and transmit the synchronization signal to the 3D control signal generator that is turned on.

Further, the power controller may receive the synchronization signal from the central processor, and connect or intercept the power supplied to the synchronization signal receiver and the central processor in accordance with a reception time interval of the synchronization signal to turn on or turn off the synchronization signal receiver or the central processor.

At this time, the power controller may calculate an expected time for reception of the subsequent synchronization signal on the basis of a reception time of the lastly received synchronization signal and turn on the synchronization signal receiver and the central processor on the calculated expected time for reception of the synchronization signal, and turn off the synchronization signal receiver and the central processor when it receives a new synchronization signal.

At this time, the expected time for reception of the subsequent synchronization signal may be acquired by adding N times (at this time, N is an integer of 1 or more) of the reception time interval of the synchronization signal to the reception time of the lastly received synchronization signal.

In addition, the power controller may turn on the synchronization signal receiver and the central processor at a time earlier than the calculated expected time for reception of the synchronization signal by a predetermined time interval.

Meanwhile, in order to achieve the above-mentioned object, according to another aspect of the present invention, a 3D image viewing system includes: a display apparatus that generates a left-eye image and a right-eye image, alternately displays the generated left-eye image and right-eye image at a predetermined time interval, and outputs 3D image synchronization signals for the displayed left-eye image and light-eye image; and a 3D image viewing apparatus that receives the synchronization signal from the display apparatus and opens or intercepts a left-eye glass and a right-eye glass in accordance with the synchronization signal, wherein the 3D image viewing apparatus includes a synchronization signal receiver that receives the synchronization signal; a 3D control signal generator that generates a left-eye glass control signal and a right-eye glass control signal in accordance with the synchronization signal received by the synchronization signal receiver; a left-eye glass that opens or intercepts light transmitted to the left-eye glass in accordance with the left-eye glass control signal; a right-eye glass that opens or intercepts light transmitted to the right-eye glass in accordance with the right-eye glass control signal; a central processor that controls an operation of the 3D control signal generator in accordance with the synchronization signal received by the synchronization signal receiver and transmits the synchronization signal to the 3D control signal generator; and a power controller that connects or intercepts power supplied to the synchronization signal receiver and the central processor.

DESCRIPTION OF THE PREFERRED EMBODIMENTS

Hereinafter, embodiments of the present invention will be described in detail with reference to the accompanying drawings. However, the embodiments are just exemplary and the present invention is not limited thereto.

In describing the present invention, well-known functions or constructions will not be described in detail since they may unnecessarily obscure the understanding of the present invention. In addition, terms described below as terms defined by considering their functions in the present invention may be changed depending on a user or operator's intention or a convention. Therefore, the definitions should be made on the basis of overall contents of the specification.

The spirit of the present invention is defined by the appended claims and the exemplary embodiments will be just provided so that those skilled in the art fully appreciate the spirit of the present invention.

Figure 1:
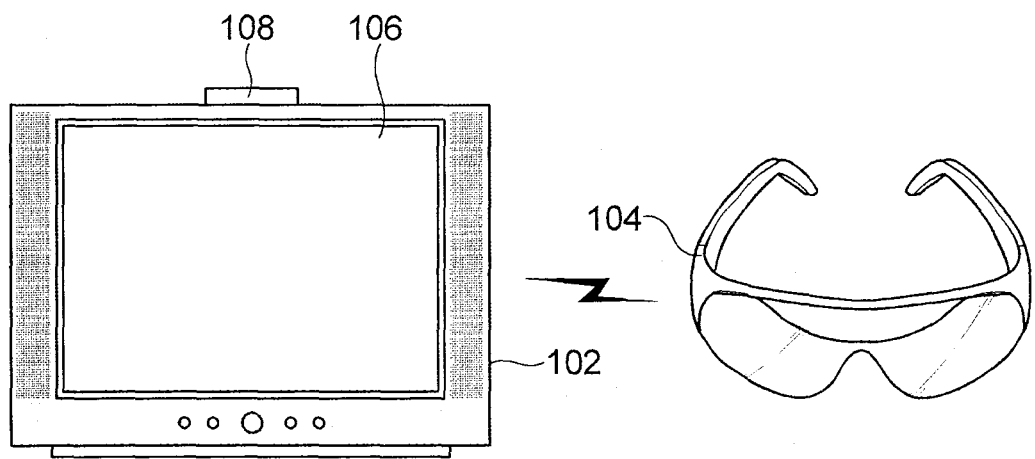
FIG. 1 is a diagram showing a 3D image viewing system 100 according to an embodiment of the present invention.

FIG. 1 is a diagram showing a 3D image viewing system 100 according to an embodiment of the present invention.

As shown in the figure, a 3D image viewing system 100 according to an embodiment of the present invention includes a display apparatus 102 and a 3D image viewing apparatus 104 for viewing a 3D image.

The display apparatus 102 as an apparatus for outputting the 3D image includes a display 106 and a synchronization signal transmitter 108. The display apparatus 102 generates a left-eye image and a right-eye image and alternately outputs the generated left-eye image and right-eye image through the display 106 at a regular time interval. Further, the display apparatus 102 generates a synchronization signal Vsync for the outputted left-eye image and right-eye image and transmits the generated synchronization signal to the 3D image viewing apparatus 104 through the synchronization signal transmitter 108. The synchronization signal transmitter 108 includes an RF transmitter and is configured to transmit the synchronization signal Vsync through an RF signal.

The 3D image viewing apparatus 104 includes a left-eye glass and a right-eye glass of a shutter glass type capable of separately intercepting external light and receives the synchronization signal Vsync transmitted from the display apparatus 102 and alternately intercepts or opens the left-eye glass and the right-eye glass in synchronization with a left-eye image and a right-eye image displayed by the display apparatus 102. Therefore, the left-eye image outputted through the display 106 is transferred to only a left eye of a wearer of the shutter glass 104 and the right-eye image is transferred to only a right eye of the wearer to give a 3D effect to a user.

Figure 2:
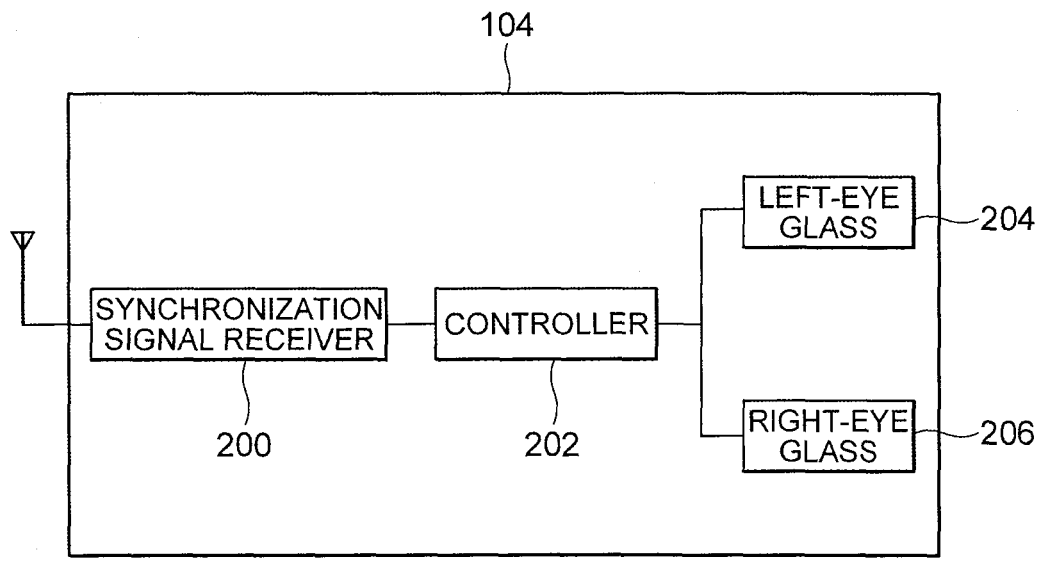
FIG. 2 is a block diagram showing a configuration of a 3D image viewing apparatus 104 according to an embodiment of the present invention.

FIG. 2 is a block diagram showing a configuration of a 3D image viewing apparatus 104 according to an embodiment of the present invention.

As shown in the figure, the 3D image viewing apparatus 104 according to the embodiment of the present invention includes a synchronization signal receiver 200, a controller 202, a left-eye glass 204, and a right-eye glass 206.

The synchronization signal receiver 200 is wirelessly connected with the synchronization signal transmitter 108 of the display apparatus 102 and receives a 3D image synchronization signal Vsync from the synchronization signal transmitter 108 by using an RF transmission and reception scheme. As such, when the synchronization signal is transmitted and received between the display apparatus 102 and the 3D image viewing apparatus 104 by using the RF scheme, a transmitter and a receiver need not to face each other and the synchronization signal can be stably received in comparison with a scheme using infrared rays in the prior art.

The controller 202 receives the synchronization signal Vsync from the synchronization signal receiver 200 and generates a left-eye glass control signal and a right-eye glass control signal depending on the received synchronization signal Vsync. At this time, the left-eye glass control signal is a signal for transmitting light to the left-eye glass 204 at a time when the display apparatus 102 outputs the left-eye image and intercepting the light transmitted to the left-eye glass 204 at a time when the display apparatus 102 outputs the right-eye image. Further, the right-eye glass control signal is a signal for light transmitted to the right-eye glass 206 at the time when the display apparatus 102 outputs the right-eye image and intercepting the light transmitted to the right-eye glass 206 at the time when the display apparatus 102 outputs the left-eye image. Such a detailed configuration of the controller 202 will be described in detail with reference to FIG. 3.

Meanwhile, the synchronization signal receiver 200 and the controller 202 may be implemented by, for example, a Zigbee system on chip. However, this is just one example and it will be apparent to those skilled in the art that the synchronization signal receiver 200 and the controller 202 according to the embodiment of the present invention may be configured by any means capable of performing the above-mentioned function.

The left-eye glass 204 receives the left-eye glass control signal from the synchronization signal receiver 200 and thus opens or intercepts the light transmitted to the left-eye glass. Specifically, the left-eye glass 204 transmits the light to the left-eye glass 204 at the time when the display apparatus 102 outputs the left-eye image and intercepts the light transmitted to the left-eye glass 204 at the time when the display apparatus 102 outputs the right-eye image.

The right-eye glass 206 receives the right-eye glass control signal from the synchronization signal receiver 200 and thus opens or intercepts the light transmitted to the right-eye glass. Specifically, the right-eye glass 206 transmits the light to the right-eye glass 206 at the time when the display apparatus 102 outputs the right-eye image and intercepts the light transmitted to the right-eye glass 206 at the time when the display apparatus 102 outputs the left-eye image.

Figure 3:
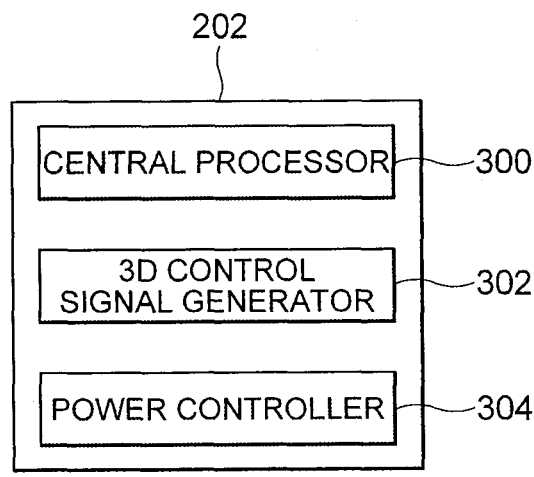
FIG. 3 is a block diagram showing a configuration of a controller 202 of a 3D image viewing apparatus 104 according to an embodiment of the present invention.

FIG. 3 is a block diagram showing a configuration of a controller 202 of a 3D image viewing apparatus 104 according to an embodiment of the present invention.

As shown in the figure, the controller 202 of the 3D image viewing apparatus 104 according to an embodiment of the present invention includes a central processor 300, a 3D control signal generator 302, and a power controller 304.

The central processor 300 receives the synchronization signal Vsync from the synchronization signal receiver 200 and thus controls an operation of the 3D control signal generator 302. Specifically, when the central processor 300 receives the synchronization signal Vsync from the synchronization signal receiver 200, the central processor 300 turns on the 3D control signal generator 302 and transmits the received synchronization signal Vsync to the 3D control signal generator 302 that is turned on.

The 3D control signal generator 302 is turned on by the central processor 300. The 3D control signal generator 302 receives the synchronization signal Vsync from the central processor 300 and generates a left-eye glass control signal and the right-eye glass control signal in accordance with the transmitted synchronization signal Vsync. The left-eye glass control signal and the right-eye glass control signal have been described in detail in FIG. 2 and therefore, they will not be described in detail herein.

The power controller 304 is a module controlling power supplied to the synchronization signal receiver 200 and the controller 202 and specifically, the power controller 304 is configured to connect or intercept the power supplied to the synchronization signal receiver 200 and the central processor 300. A detailed operation of the power controller 304 will now be described with reference to FIGS. 4 and 5.

Figure 4:
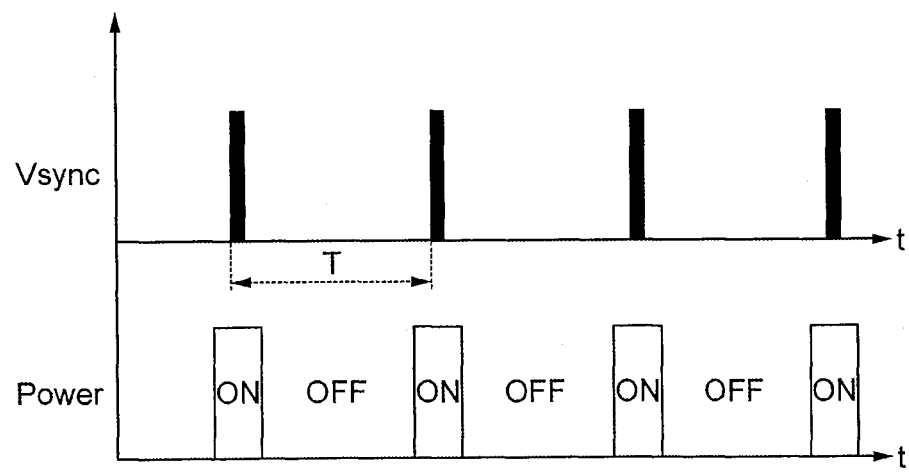
FIGS. 4 and 5 are diagrams describing power control processes in a power controller 304 according to an embodiment of the present invention.
Figure 5:
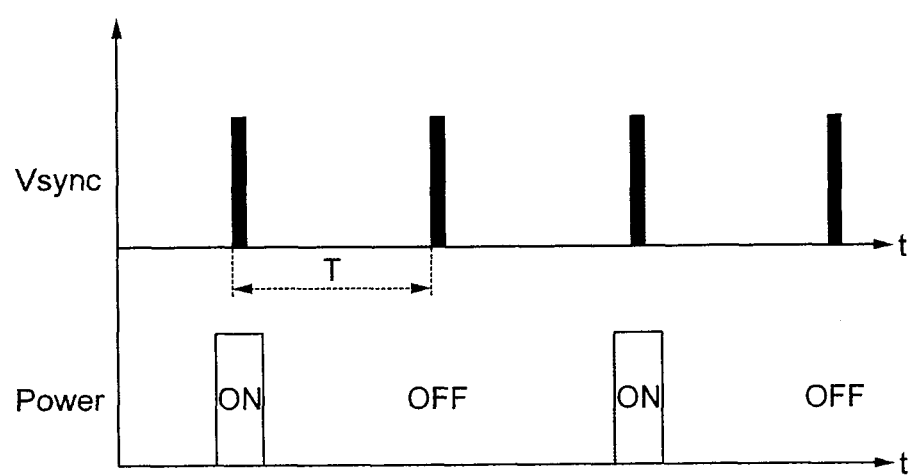

FIGS. 4 and 5 are diagrams describing power control processes in a power controller 304 according to an embodiment of the present invention.

In FIGS. 4 and 5, the upper graph represents the synchronization signal Vsync transmitted from the synchronization signal transmitter 108 and the lower graph represents the state of the power supplied to the synchronization signal receiver 200 and the central processor 300 in accordance with the control of the power controller 304. That is, the power is supplied to the synchronization signal receiver 200 and the central processor 300, which are turned on in only a section marked with "ON" in the figure and in the rest sections, the synchronization signal receiver 200 and the central processor 300 are turned off.

The synchronization signal transmitter 108 of the display apparatus 102 transmits the synchronization signal Vsync at a predetermined time interval T in accordance with screen scanning rate 1/T of the display 106, the synchronization signal receiver 200 receives the transmitted synchronization signal and transmits it to the central processor 300, and the central processor 300 transmits the synchronization signal to the 3D control signal generator 302 to generate the left-eye glass control signal and the right-eye glass control signal. That is, in the embodiment of the present invention, the 3D control signal generator 302 that should continuously generate the left-eye glass control signal and the right-eye glass control signal should be continuously turned on throughout an operation time of the 3D image viewing apparatus 104, but the synchronization signal receiver 200 and the central processor 300 need to be turned on in a section in which the synchronization signal Vsync is received and in the rest of the sections, the synchronization signal receiver 200 and the central processor 300 needs not to be turned on. Therefore, as shown in FIG. 4, when the power controller 304 according to the embodiment of the present invention receives the synchronization signal Vsync from the central processor 300, the power controller 304 connects or intercepts the power supplied the synchronization signal receiver 200 and the central processor 300 in accordance with a reception time interval T of the synchronization signal as shown in FIG. 4.

Specifically, the power controller 304 calculates an expected time for reception of the subsequent synchronization signal on the basis of the reception time of the lastly received synchronization signal Vsync, and supplies the power to the synchronization signal receiver 200 and the central processor 300 on the calculated expected time for reception of the synchronization signal to turn on the synchronization signal receiver 200 and the central processor 300. Further, when the power controller 304 receives a new synchronization signal from the synchronization signal receiver 200 that is turned on, the power controller 304 turns off the synchronization signal receiver 200 and the central processor 300, thereby preventing unnecessary power consumption.

The above-mentioned expected time for reception of the synchronization signal may be calculated by adding the reception time interval T of the synchronization signal Vsync to the reception time of the last synchronization signal Vsync, as an example. At this time, the power controller 304 may be configured to turn on the synchronization signal receiver 200 and the central processor 300 at a time earlier than the calculated expected time for reception of the subsequent synchronization signal by a predetermined time interval (it may be properly determined according to the detailed embodiment) by considering an error for each apparatus.

Meanwhile, the synchronization signal Vsync is transmitted and received to compensate a synchronization error between the display apparatus 102 and the 3D image viewing apparatus 104. Therefore, the 3D image viewing apparatus 104 may not need to receive the synchronization signal Vsync every time interval T according to the embodiment. For example, although the synchronization error of the 3D image viewing apparatus 104 is compensated receiving the synchronization signal Vsync ever 3 time intervals, when a user can easily view a 3D image, receiving the synchronization signal Vsync every 3 time intervals is more preferable to receiving the synchronization signal Vsync every time interval in terms of efficient use of a power supply (battery).

FIG. 5, which is to describe the above, shows an embodiment in which the power is supplied to the synchronization signal receiver 200 and the central processor 300 every time interval two times longer than the transmission time interval T of the synchronization Vsync in the display apparatus 102 to receive the synchronization signal Vsync.

That is, in the embodiment of FIG. 5, the expected time for reception of the subsequent synchronization signal may be determined by adding N times (at this time, N is an integer of 5 or more) of the reception time interval T of the synchronization signal Vsync to the reception time of the lastly received synchronization signal Vsync. Even at this time, like as shown in FIG. 4, the power controller 304 may be configured to turn on the synchronization signal receiver 200 and the central processor 300 at a time earlier than the calculated expected time for reception of the subsequent synchronization signal by a predetermined time interval (it may be properly determined according to the detailed embodiment) by considering an error for each apparatus.

When the power controller 304 is configured to receive the synchronization signal Vsync every time interval N times longer than the reception time interval of the synchronization signal Vsync, it is possible to markedly save battery consumption at the time of receiving the synchronization signal Vsync every time interval of N times rather than at the time of receiving the synchronization signal Vsync every time interval.

According to the present invention, it is possible to minimize power consumption of a 3D image viewing apparatus by supplying power to a synchronization signal receiver and a central processor at only a time when a synchronization signal is received and intercepting the power during the rest period.

Further, according to the present invention, since the synchronization signal is transmitted and received in accordance with an RF transmission and reception scheme, directionality of the existing IR scheme can be improved and the synchronization signal can be stably transmitted and received.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

Accordingly, the spirit and scope of the present invention is not limited to the exemplary embodiments and should be defined by the appended claims and the equivalents thereto.

What is claimed is:

1. A 3D image viewing apparatus, comprising:
a synchronization signal receiver configured to receive a 3D image synchronization signal;
a 3D control signal generator configured to generate a left-eye glass control signal and a right-eye glass control signal in accordance with the synchronization signal;
a left-eye glass configured to pass or intercept light transmitted to the left-eye glass in accordance with the left-eye glass control signal;
a right-eye glass configured to pass or intercept light transmitted to the right-eye glass in accordance with the right-eye glass control signal;
a central processor configured to
control the 3D control signal generator in accordance with the synchronization signal, and
transmit the synchronization signal to the 3D control signal generator; and
a power controller configured to
receive the synchronization signal from the central processor, and
connect or disconnect power supplied to the synchronization signal receiver and the central processor in accordance with a reception time interval of the synchronization signal to turn on or turn off the synchronization signal receiver or the central processor.

2. The 3D image viewing apparatus according to claim 1, wherein the synchronization signal receiver is configured to receive the synchronization signal in accordance with an RF communication scheme.

3. The 3D image viewing apparatus according to claim 1, wherein when the central processor receives the synchronization signal from the synchronization signal receiver, the central processor is configured to
turn on the 3D control signal generator, and
transmit the synchronization signal to the 3D control signal generator that is turned on.

4. The 3D image viewing apparatus according to claim 1, wherein the power controller is configured to
calculate an expected time for reception of the subsequent synchronization signal on the basis of a reception time of the lastly received synchronization signal, and
turn on the synchronization signal receiver and the central processor on the calculated expected time for reception of the subsequent synchronization signal.

5. The 3D image viewing apparatus according to claim 4, wherein when the power controller receives a new synchronization signal, the power controller is configured to turn off the synchronization signal receiver and the central processor.

6. The 3D image viewing apparatus according to claim 4, wherein the expected time for reception of the subsequent synchronization signal is acquired by adding N times, where N is an integer equal to or larger than 1, of the reception time interval of the synchronization signal to the reception time of the lastly received synchronization signal.

7. The 3D image viewing apparatus according to claim 5, wherein the power controller is configured to turn on the synchronization signal receiver and the central processor at a time earlier than the calculated expected time for reception of the subsequent synchronization signal by a predetermined time interval.

8. A 3D image viewing system, comprising:
a display apparatus configured to
generate a left-eye image and a right-eye image,
display alternately the generated left-eye image and right-eye image at a predetermined time interval, and
output 3D image synchronization signals for the displayed left-eye image and right-eye image; and
a 3D image viewing apparatus that includes
a synchronization signal receiver configured to receive the synchronization signal,
a 3D control signal generator configured to generate a left-eye glass control signal and a right-eye glass control signal in accordance with the synchronization signal,
a left-eye glass configured to pass or intercept light transmitted to the left-eye glass in accordance with the left-eye glass control signal,
a right-eye glass configured to pass or intercept light transmitted to the right-eye glass in accordance with the right-eye glass control signal,
a central processor configured to
control the 3D control signal generator in accordance with the synchronization signal, and
transmit the synchronization signal to the 3D control signal generator, and
a power controller configured to
receive the synchronization signal from the central processor, and
connect or disconnect power supplied to the synchronization signal receiver and the central processor in accordance with a reception time interval of the synchronization signal to turn on or turn off the synchronization signal receiver or the central processor.

* * * * *